US012560531B2

(12) United States Patent
D'Apuzzo et al.

(10) Patent No.: US 12,560,531 B2
(45) Date of Patent: Feb. 24, 2026

(54) INTEGRATED FLUID EJECTION AND SPECTROSCOPIC SENSING

(71) Applicant: HEWLETT-PACKARD DEVELOPMENT COMPANY, L.P., Spring, TX (US)

(72) Inventors: Fausto D'Apuzzo, Palo Alto, CA (US); Viktor Shkolnikov, Palo Alto, CA (US); Alexander N. Govyadinov, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 948 days.

(21) Appl. No.: 17/778,957

(22) PCT Filed: Apr. 4, 2020

(86) PCT No.: PCT/US2020/026768
§ 371 (c)(1),
(2) Date: May 23, 2022

(87) PCT Pub. No.: WO2021/126299
PCT Pub. Date: Jun. 24, 2021

(65) Prior Publication Data
US 2023/0008110 A1 Jan. 12, 2023

(51) Int. Cl.
*G01N 21/25* (2006.01)
*B01L 3/00* (2006.01)
*G01N 35/10* (2006.01)

(52) U.S. Cl.
CPC ...... *G01N 21/255* (2013.01); *B01L 3/502715* (2013.01); *G01N 35/1016* (2013.01); *B01L 2300/0663* (2013.01); *B01L 2300/0829* (2013.01); *B01L 2300/168* (2013.01); *B01L 2400/02* (2013.01)

(58) Field of Classification Search
CPC .............. G01N 21/255; G01N 35/1016; B01L 3/502715; B01L 2300/0663; B01L 2300/0829; B01L 2300/168; B01L 2400/02
See application file for complete search history.

(56) References Cited

U.S. PATENT DOCUMENTS 5,856,833 A 1/1999 Elgee
6,091,479 A 7/2000 Frosig
6,104,485 A * 8/2000 Wang ..................... G01N 21/03 356/246
6,856,462 B1 2/2005 Scarbrough
6,952,880 B2 10/2005 Saksa
7,416,127 B2 8/2008 Page
(Continued)

FOREIGN PATENT DOCUMENTS

CN 102202899 9/2011
CN 104802519 7/2015
(Continued)

*Primary Examiner* — Jill A Warden
(74) *Attorney, Agent, or Firm* — Foley & Lardner LLP

(57) ABSTRACT

An integrated fluid ejection and spectroscopic sensing system may include a fluid ejector to eject a droplet of fluid through an ejection orifice towards a deposition site, a sensor array, a dispersive element to project light onto the sensor array. The dispersive element, the sensor and the fluid ejector are joined as part of an integrated unit.

13 Claims, 9 Drawing Sheets

(56) References Cited

U.S. PATENT DOCUMENTS

| | | | |
|---|---|---|---|
| 7,524,042 B2 | 4/2009 | Weksler | |
| 7,527,692 B2 | 5/2009 | Nakagawa et al. | |
| 7,611,217 B2 | 11/2009 | Shamoun | |
| 7,623,233 B2 | 11/2009 | Freese | |
| 7,901,026 B2 | 3/2011 | Albertalli | |
| 7,950,785 B2 | 5/2011 | Usuda | |
| 8,252,234 B2 | 8/2012 | Clarke | |
| 8,379,210 B2 * | 2/2013 | Thomson | G01N 21/0303 356/440 |
| 8,562,095 B2 | 10/2013 | Alleyne | |
| 8,579,397 B2 | 11/2013 | Barss | |
| 9,007,586 B2 | 4/2015 | Clark | |
| 9,297,765 B2 | 3/2016 | Grabbe | |
| 9,308,731 B2 | 4/2016 | Williams | |
| 9,400,253 B2 | 7/2016 | Horn | |
| 9,643,152 B2 | 5/2017 | Cronin | |
| 9,832,428 B2 | 11/2017 | Hauf | |
| 10,034,392 B2 | 7/2018 | Gothait | |
| 10,336,062 B2 | 7/2019 | Sreenivasan | |
| 2002/0089561 A1 | 7/2002 | Weitzel | |
| 2002/0176801 A1 * | 11/2002 | Giebeler et al. | G01N 21/253 422/82.05 |
| 2002/0186269 A1 | 12/2002 | Endo | |
| 2005/0036145 A1 | 2/2005 | Meada et al. | |
| 2005/0151767 A1 | 7/2005 | Yeh | |
| 2006/0071957 A1 | 4/2006 | Shang | |
| 2008/0143776 A1 | 6/2008 | Konno | |
| 2008/0170719 A1 | 7/2008 | Shimura et al. | |
| 2008/0180719 A1 | 7/2008 | Lutnesky | |
| 2011/0026025 A1 | 2/2011 | Govyadinov | |
| 2011/0178359 A1 | 7/2011 | Hirschman | |
| 2014/0002535 A1 | 1/2014 | Chen | |
| 2015/0290949 A1 | 10/2015 | Gomi | |
| 2018/0083230 A1 | 3/2018 | Harjee | |
| 2018/0136149 A1 * | 5/2018 | Braumann et al. | G01N 24/088 422/174 |
| 2018/0169934 A1 | 6/2018 | Liu | |

FOREIGN PATENT DOCUMENTS

| | | | | |
|---|---|---|---|---|
| CN | 105682930 | | 6/2016 | |
| CN | 106371967 | | 2/2017 | |
| EP | 1607064 | A2 * | 12/2005 | H04N 13/15 |
| EP | 2066437 | A2 | 6/2009 | |
| EP | 2688748 | | 8/2018 | |
| JP | 2001322295 | A | 11/2001 | |
| JP | 3801604 | B2 | 7/2006 | |
| JP | 2008230190 | A | 10/2008 | |
| JP | WO2017145230 | A1 * | 8/2017 | C12Q 1/6869 |
| KR | 20030043671 | A | 6/2003 | |
| TW | 200720103 | | 6/2007 | |
| TW | 200904647 | | 2/2009 | |
| WO | WO-2018157012 | A1 * | 8/2018 | B01L 3/508 |

* cited by examiner

500

504 — CONCURRENTLY AIM A FLUID EJECTOR AND A DISPERSIVE ELEMENT AT A DEPOSITION SITE, THE DISPERSIVE ELEMENT PROJECTING DISPERSED LIGHT ONTO A SENSOR ARRAY

508 — EJECT A DROP OF FLUID FROM THE FLUID EJECTOR ONTO THE DEPOSITION SITE

512 — OBTAIN A SPECTROSCOPIC MEASUREMENT OF THE DEPOSITION SITE BASED UPON SIGNALS FROM THE SENSOR ARRAY

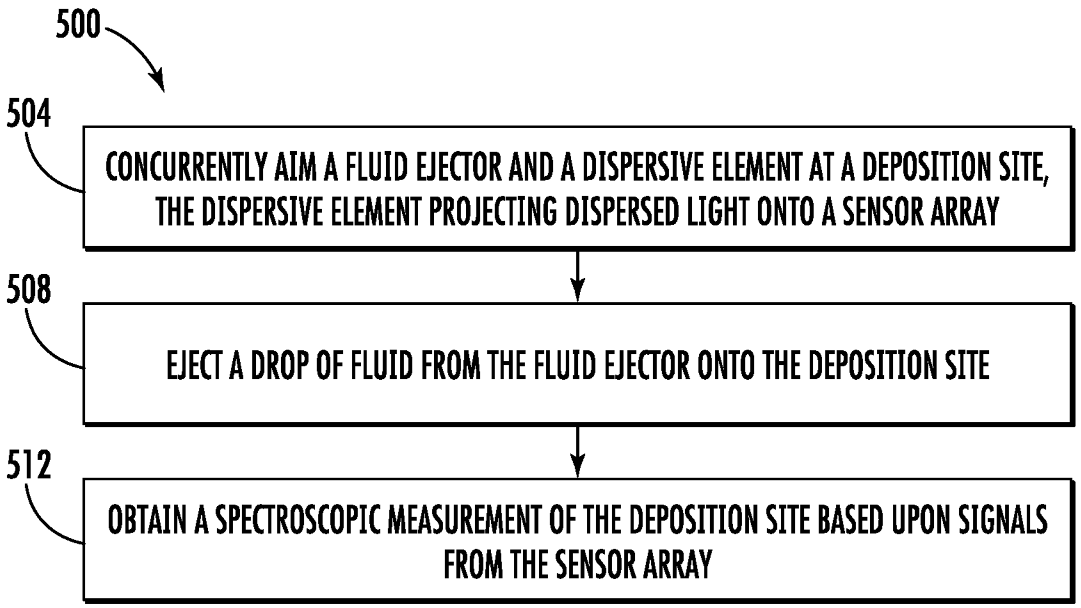

604 — CONCURRENTLY AIM A FLUID EJECTOR AND A DISPERSIVE ELEMENT AT A DEPOSITION SITE, THE DISPERSIVE ELEMENT PROJECTING DISPERSED LIGHT ONTO A SENSOR ARRAY

612 — OBTAIN A SPECTROSCOPIC MEASUREMENT OF THE DEPOSITION SITE BASED UPON SIGNALS FROM THE SENSOR ARRAY

614 — DETERMINE A REACTION STATE BASED ON THE SPECTROSCOPIC MEASUREMENT

618 — EJECT A DROP OF FLUID FROM THE FLUID EJECTOR ONTO THE DEPOSITION SITE BASED ON THE DETERMINED REACTION STATE

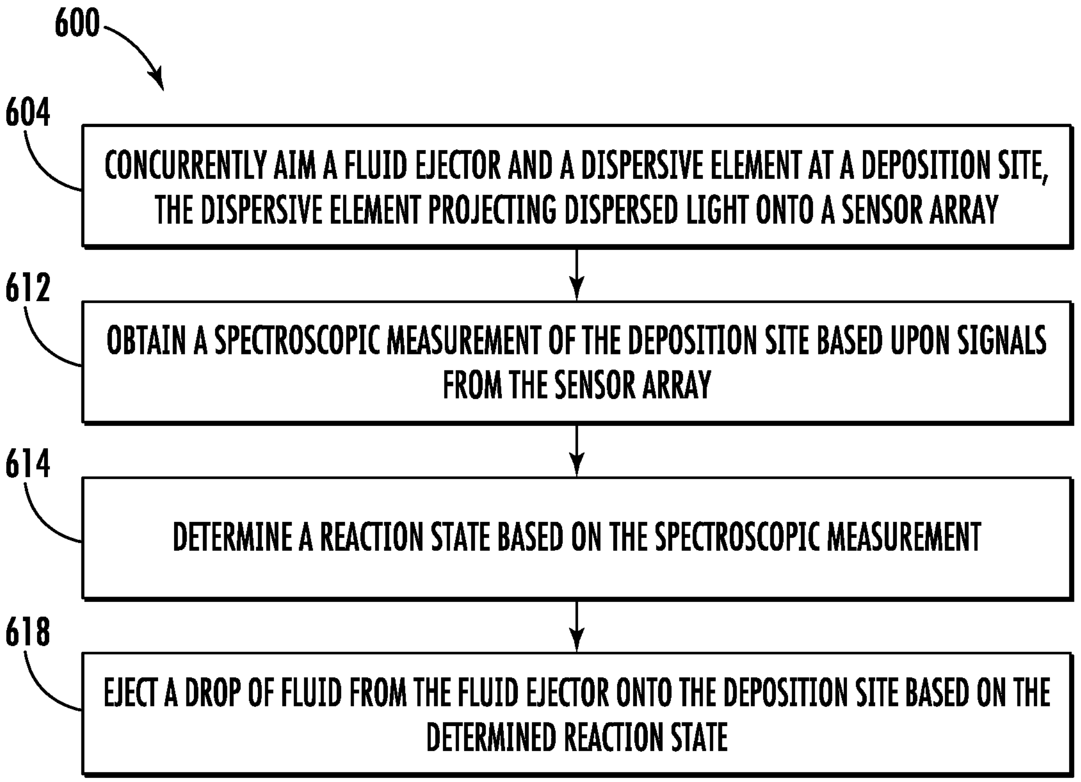

FIG. 7

INTEGRATED FLUID EJECTION AND SPECTROSCOPIC SENSING

BACKGROUND

Reaction processes may be used in a wide variety of applications such as environmental testing and biomedical diagnostics. Spectroscopy is sometimes used to monitor reaction processes. Well plates are sometimes used to provide multiple wells in which different reaction processes may take place.

BRIEF DESCRIPTION OF THE DRAWINGS

FIG. 6 is a flow diagram of an example fluid ejection and spectroscopic sensing method.

FIG. 7 is a flow diagram of an example fluid ejection and spectroscopic sensing method.

Figure 1:
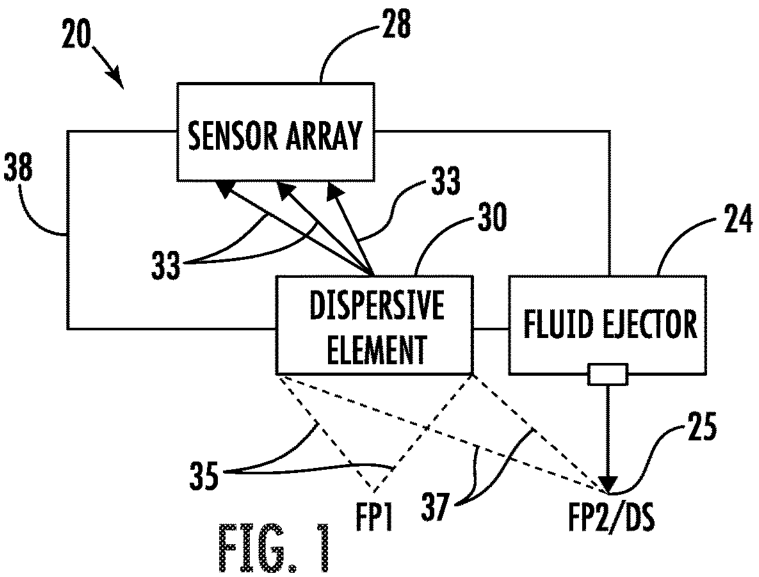
FIG. 1 is a block diagram somatically illustrating portions of an example integrated fluid ejection and spectroscopic sensing system.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example systems and methods that integrate fluid ejection and spectroscopic sensing capabilities or functions. Spectroscopic sensing is provided by a light dispersive element and a sensor array. Such spectroscopic sensing may be carried out in any of various modes including ultraviolet, visible light, infrared, fluorescent and Raman modes. The example systems and methods join a fluid ejector, the sensor array and the light dispersive element as part of an integrated unit. For purposes of this disclosure, an "integrated unit" means that the individual elements are interconnected as a single assembly or body with the elements having a predefined inter-relationship. As a result, the systems are more compact and the inter-related functions carried out by the different elements may be more consistent and predictable.

In some implementations, the fluid ejector, the sensor array and the light dispersive element are joined as part of an integrated unit by a single monolithic packaging. In some implementations, the fluid ejector, the sensor array and the light dispersive element are supported by different or distinct bodies or units, wherein different bodies are mounted to one another as part of an integrated unit.

Disclosed are example systems and methods that integrate fluid ejection and spectroscopic sensing capabilities or functions, wherein a fluid ejector and a light dispersive element are supported so as to be concurrently aimed at the same deposition site that is to receive a fluid droplet. The spectroscopic information from the deposition site may be used to determine a reaction state immediately following the ejection of a droplet onto the deposition site, without repositioning of the deposition site and without time-consuming alignment with an independent spectroscopic sensing device. As a result, reaction monitoring may be carried out in much shorter amount of time or in real time.

Conversely, spectroscopic information may be used to determine a reaction state at a deposition site, wherein subsequent ejection of a fluid droplet onto the deposition site may be controlled based upon the determined reaction state. Such closed-loop feedback may likewise occur without repositioning of the deposition site and without time-consuming alignment of the deposition site with respect to a fluid ejector for ejecting the subsequently deposited fluid droplet.

Disclosed are example integrated fluid ejection and spectroscopic sensing systems that may include a fluid ejector to eject a droplet of fluid through an ejection orifice towards a deposition site, a sensor array, and a dispersive element to project light onto the sensor array. The dispersive element, the sensor and the fluid ejector are joined as part of an integrated unit.

Disclosed are example integrated fluid ejection and spectroscopic sensing methods. The methods may include concurrently aiming a fluid ejector and a dispersive element at a deposition site, the dispersive element projecting dispersed light onto a sensor array, ejecting a drop of fluid from the fluid ejector onto the deposition site and obtaining a spectroscopic measurement of the deposition site based upon signals from the sensor array.

Disclosed are example integrated fluid ejection and spectroscopic sensing methods that may include concurrently aiming a fluid ejector and a dispersive element at a deposition site, the dispersive element projecting dispersed light onto a sensor array. The method may further include obtaining a spectroscopic measurement of the deposition site based upon signals from the sensor array and determining a reaction state based upon the spectroscopic measurement. Based upon the determined reaction state, a drop of fluid may be ejected from the fluid ejector onto the deposition site.

Disclosed are example methods for forming example integrated fluid ejection and spectroscopic sensing systems. The methods may include providing a fluid ejector to eject a droplet of fluid, providing a dispersive element to project dispersed light onto a sensor array and joining the fluid ejector and the dispersive element such that the fluid ejector and the dispersive element are concurrently aimed at a deposition site.

FIG. 1 is a block diagram schematically illustrating portions of an example integrated fluid ejection and spectroscopic sensing system 20. System 20 comprises fluid ejector 24, sensor array 28, and dispersive element 30.

Fluid ejector 24 comprises a device to selectively eject fluid droplets towards and onto a deposition site 25 on an example target. In some implementations, fluid ejector 24 is electrically powered and controlled through the transmission of electrical signals. In some implementations, fluid ejector 24 comprises a fluid ejection chamber that is supplied with fluid from a fluid reservoir, the fluid to be ejected by a fluid actuator that is selectively actuated to displace fluid within the chamber through an ejection orifice or nozzle opening.

In one implementation, the fluid actuator may comprise a thermal resistor which, upon receiving electrical current, heats to a temperature above the nucleation temperature of the fluid so as to vaporize a portion of the adjacent fluid to create a bubble which displaces the fluid through the associated orifice. In other implementations, the fluid actuator may comprise other forms of fluid actuators. In other implementations, the individual fluid actuators may be in the form of a piezo-membrane based actuator, an electrostatic membrane actuator, mechanical/impact driven membrane actuator, a magneto-strictive drive actuator, an electrochemical actuator, and external laser actuators (that form a bubble through boiling with a laser beam), other such microdevices, or any combination thereof.

Sensing array 28 comprises a linear or two-dimensional array of sensing elements, each element outputting electrical signals based upon and in response to the impingement of light upon such elements. In some implementations, the individual sensing elements of sensor array 28 may each comprise a complementary metal-oxide-semiconductor (CMOS), a charge coupled device (CCD) sensor element, a photodiode (PiN), photo-resistive sensor element or other types of a sensing element. Sensor array 28 may be fabricated with fluid ejector 24 or may be package adjacent to fluid ejector 24.

Dispersive element 30 focuses dispersed light (schematically represented by arrows 33) onto sensor array 28. Dispersive element 30 disperses light into its frequency or wavelength (color) components and focuses the dispersed light onto sensor array 28 for carrying out spectral analysis. Examples of dispersive element 30 include, but are not limited to, flat lenses such as Fresnel lenses, zone plate lenses and meta-lenses, and diffraction gratings.

As indicated by broken lines 35, in some implementations, dispersive element 30 may be focused towards a focal point FP1 that is distinct or spaced from deposition site 25. In such an implementation, system 20 may obtain or collect spectroscopic information from a location at FP1 while fluid is being ejected onto deposition site 25. In such an implementation, the ejection of fluid droplets onto a site and the collection of spectroscopic information from a separate site may be concurrently carried out. Following the deposition of a fluid droplet onto deposition site 25, time is provided for a chemical or biological reaction to take place while dispersive element 30 is moved to relocate its focus onto deposition site 25 for the collection of spectroscopic information from deposition site 25.

As shown by broken lines 37, in some implementations, dispersive element 30 may be focused on the deposition site 25, concurrent with fluid ejector 24. As will be described hereafter, in such implementations, such concurrent focusing facilitates sensing of a reaction state at the deposition site 25 immediately following deposition of a droplet by fluid ejector 24 on the same deposition site 25 without movement of the deposition site 25 or dispersive element 30 following ejection of the fluid droplet. Such concurrent focusing may further facilitate the ejection of a fluid droplet by fluid ejector 24 onto the deposition site 25 immediately following the determination of a reactive state at deposition site 25 without movement of the deposition site 25 or fluid ejector 24.

As schematically indicated by line 38, fluid ejector 24, sensor array 28 and dispersive element 30 are mechanically or physically joined to one another, directly or indirectly, so as to move in unison with one another. In other words, movement of fluid ejector 24 also results in sensor array 28 and dispersive element 30 moving. As a result, a single actuator may be employed to move each of fluid ejector 24, dispersive element 30 and sensor array 28.

Figure 2:
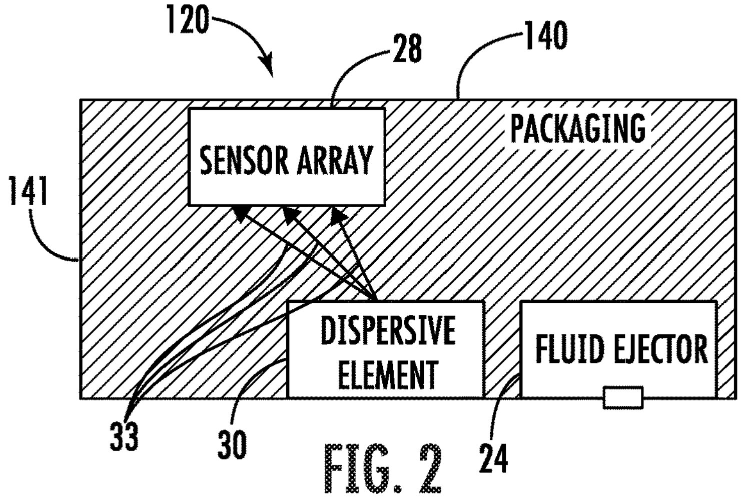
FIG. 2 is a sectional view schematically illustrating portions of an example integrated fluid ejection and spectroscopic sensing system.

FIG. 2 is a sectional view schematically illustrating portions of an integrated fluid ejection and spectroscopic sensing system 120. System 120 is similar to system 20 except that system 120 comprises a packaging 140 that joins fluid ejector 24, dispersive element 30 and sensor array 28 as a single unit, a single package 141. In some implementations, packaging 140 comprises a homogeneous body partially surrounding and supporting fluid ejector, the sensor array and the dispersive element as part of the integrated unit. In some implementations, packaging 140 may comprise a moldable material, such as an epoxy mold compound. In an example implementation, packaging 140 comprises a liquid or moldable material which is molded about portions of fluid ejector 24, sensor array 28 and dispersive element 30 and then solidified or hardened such as through curing, polymerization, crosslinking or evaporation to form the single integral package surrounded by a single monolithic layer. In some implementations, package 140 may comprise a bracket, frame or housing.

Package 141 may be mounted in a larger system. In some implementations, package 141 is in the form of a microfluidic chip, wherein each of fluid ejector 24, dispersive element 30 and sensor array 28 is formed on the microfluidic chip. In some implementations, each of fluid ejector 24, dispersive element 30 and sensor array 28 may be supported by a printed circuit board.

Figure 3:
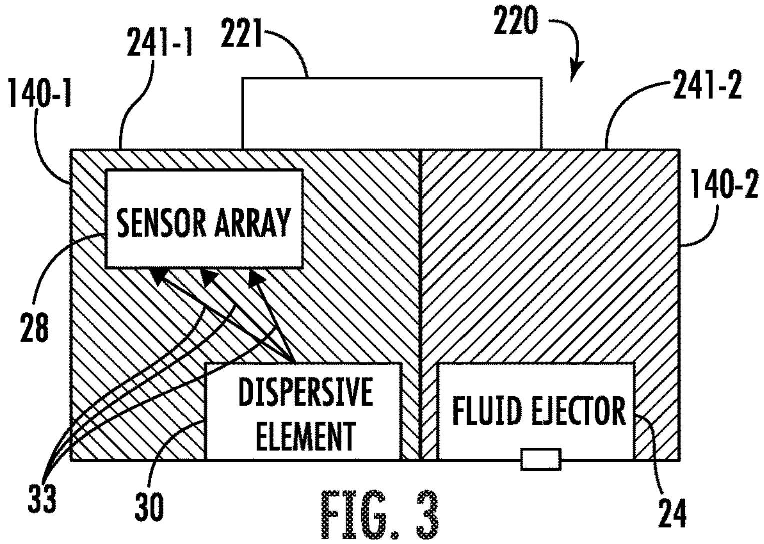
FIG. 3 is a sectional view schematically illustrating portions of an example integrated fluid ejection and spectroscopic sensing system.

FIG. 3 is a sectional view schematically illustrating portions of an integrated fluid ejection and spectroscopic sensing system 220. System 220 is similar to system 20 except that system 220 comprises two separate packages 241-1 and 241-2 that are physically or mechanically joined to one another by connector 221. Connector 221 may comprise adhesive, welding, a fastener or the like.

In some implementations, connector 221 may comprise a hinge to facilitate pivoting of package 241-1 relative to package 241-2. In some implementations, connector 221 may comprise a tongue and groove arrangement to facilitate sliding movement. In such implementations, dispersive element 30 may be moved away from fluid ejector 24 at those times during which fluid ejector 24 is being wiped or otherwise serviced.

Package 241-1 comprises a packaging 140-1 that supports sensor array 28 and dispersive element 30 as a single unit or package. Package 241-2 comprises a packaging 140-2 that supports fluid ejector 24.—That joins fluid ejector 24, dispersive element 30 and sensor array 28 as a single unit or package. In some implementations, packaging 140-1 and 140-2 major comprise a moldable material, such as an epoxy mold compound. In some implementations, packaging 140-1 and 140-2 major comprise a housing, bracket, frame of the like.

Figure 4:
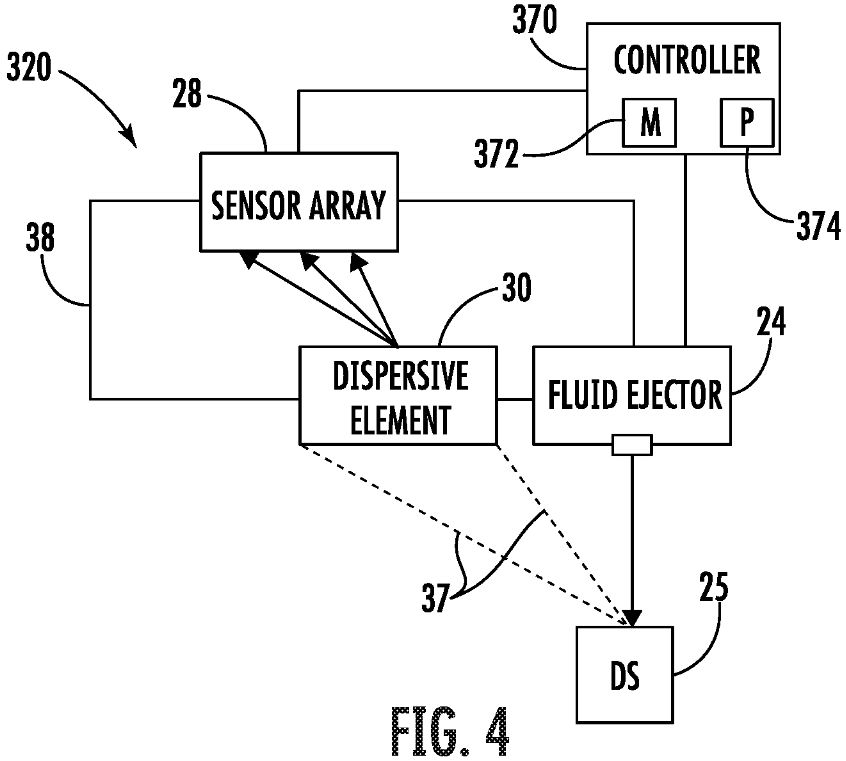
FIG. 4 is a block diagram schematically illustrating portions of an example integrated fluid ejection and spectroscopic sensing system.

FIG. 4 is a block diagram schematically illustrating portions of an example integrated fluid ejection and spectroscopic sensing system 320. System 320 is similar to system 20 described above except that dispersive element 30 and fluid ejector 24 are supported so as to be concurrently aimed at or focused upon the same deposition site 25 and that system 320 additionally comprises controller 370. The remaining components of system 320 which correspond to components of system 20 are numbered similarly. As discussed above, fluid ejector 24, sensor array 28 and dispersive element 30 may be supported as part of an integrated unit such as through the use of packaging 140 (shown and described above with respect to FIG. 2) or through the use of two separate packages 241-1 and 241-2 which are joined by connector 221 (shown and described above with respect to FIG. 3).

Controller 370 controls the ejection of fluid by fluid ejector 24 based upon signals received from sensor array 28. Controller 370 comprises memory 372 and processor 374. Memory 372 comprises a non-transitory computer-readable medium that contains instructions for directing the operation of processor 374. Following instruction contained in memory 372, processor 374 may analyze signals from sensor array 28 to determine characteristics regarding deposition site 25. For example, processor 374 may determine a state of the reaction at deposition site 25. Based upon the determined reaction state, processor 374 may further control the composition, amount and timing at which fluid is ejected by fluid ejector 24 onto deposition site 25. Because dispersive element 30 and fluid ejector 24 are concurrently aimed or focused at deposition site 25, the ejection of fluid onto deposition site 25 may occur without movement of fluid ejector 24, movement of deposition site 25 or movement of dispersive element 30 following the acquisition of spectroscopic information.

In some implementations, following instructions contained in memory 372, processor 374 may first cause fluid ejector 24 to eject fluid onto deposition site 25. Thereafter, processor 374 may obtain signals from sensor array 28 and determine a state of reaction at deposition site 25. Based upon the determined state of reaction, processor 374 may output control signals adjusting the timing, composition and/or amount of fluid ejected by fluid ejector 24 onto the same deposition site 25. In some implementations, processor 374 may output control signals that cause an actuator to reposition deposition site 25 opposite to a different fluid ejector for receiving droplets of fluid. The integration of fluid ejector 24, dispersive element 30 and sensor array 28 and the concurrent aiming of fluid ejector 24 and dispersive element 30 at a same deposition site 25 may facilitate faster, more real time closed-loop feedback over chemical or biological reactions taking place at deposition site 25.

Figure 5:
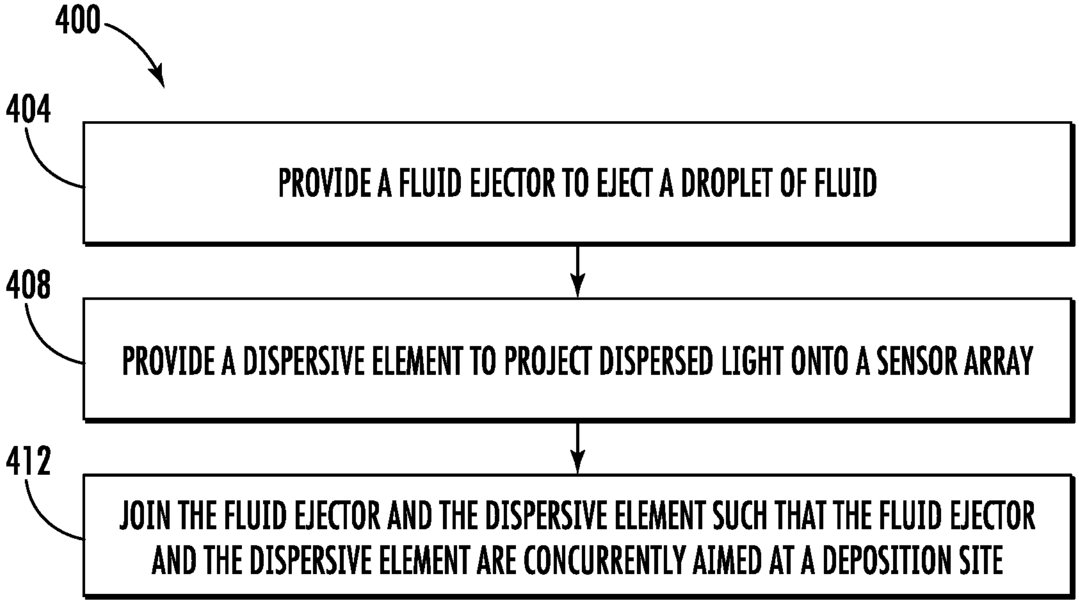
FIG. 5 is a flow diagram of an example method for forming an example integrated fluid ejection and spectroscopic sensing system.

FIG. 5 is a flow diagram illustrating portions of an example method for forming an example integrated fluid ejection and spectroscopic sensing system. Method 400 may be used for forming systems 20, 120, 220 or 320 described above, any of the following described systems or similar systems. As indicated by block 404, a fluid ejector to eject a droplet of fluid is provided. The fluid ejector may be similar to fluid ejector 24. In some implementations, the fluid ejector may be provided by forming the fluid ejector 24. In some implementations, the fluid ejector may be formed by depositing an electrical resistor on a substrate and patterning various layers of photo-imageable epoxy on the substrate to form an ejection chamber and orifice opposite the electrical resistor. Electrically conductive traces and control circuitry may be additionally deposited or formed on the substrate.

As indicated by block 408, a dispersive element that projects dispersed light onto a sensor array is provided. The dispersive element may be similar to dispersive element 30 described above. The dispersive element disperses light into its frequency or wavelength (color) components and focuses the dispersed light onto the sensor array for carrying out spectral analysis. Examples of dispersive element 30 include, but are not limited to, Fresnel lenses, diffraction gratings, zone plate lenses and meta-lenses. The sensor array may comprise an array of metal-oxide-semiconductor (CMOS) elements, a charge coupled device (CCD) sensor elements or other types of sensing elements may be formed upon the substrate or a separate substrate.

As indicated by block 412, the fluid ejector and the dispersive element are joined to one another such that the fluid ejector and the dispersive element are concurrently aimed at a deposition site. In some implementations, the fluid ejector and the dispersive element are joined by a single packaging similar to that described above with respect to system 120. For example, in some implementations, a moldable material, such as an epoxy mold compound, may interconnect and partially encapsulate the fluid ejector and the dispersive element. In some implementations, the fluid ejector and the dispersive element are supported by separate packages, housings, brackets, frames alike, but wherein the second packages are joined by connector, such as connector 221 (shown and described above with respect to FIG. 3).

FIG. 6 is a flow diagram illustrating portions of an example integrated fluid ejection and spectroscopic sensing method 500. Method 500 may facilitate faster and more real time feedback control over a chemical or biological reaction being promulgated and monitored at a deposition site. Method 500 may be carried out with any of systems 20, 120, 220 and 320 described above, with any of the below described systems or with similar systems.

As indicated by block 504, a fluid ejector, the fluid ejector 24, and a dispersive element, such as dispersive element 30, are concurrently aimed at a deposition site. The dispersive element projects dispersed light onto a sensing array.

As indicated by block 508, a drop of fluid is ejected from the fluid ejector onto the deposition site. As indicated by block 512, a spectroscopic measurement of the deposition site is obtained based upon signals from the sensor array. In some implementations, the ejection of the drop of fluid onto the deposition site may occur following obtaining of the spectroscopic measurement, wherein the amount, composition or frequency of the drop or drops is based upon the spectroscopic measurement. In some implementations, the spectroscopic measurement is obtained following the ejection of the drop onto the deposition site.

FIG. 7 is a flow diagram illustrating portions of an example integrated fluid ejection and spectroscopic sensing method 600. As indicated by block 604, a fluid ejector, such as fluid ejector 24, and a dispersive element, such as dispersive element 30, are concurrently aimed at a deposition site. The dispersive element projects dispersed light onto a sensing array.

As indicated by block 508, a drop of fluid is ejected from the fluid ejector onto the deposition site. As indicated by block 612, a spectroscopic measurement of the deposition site is obtained based upon signals from the sensor array.

As indicated by block 614, a reaction state is determined based upon the spectroscopic measurement. The reaction state may be determined with a controller, such as controller 370. For example, controlled 370 may compare the spectroscopic measurement to a lookup table associating different values for spectroscopic measurements to different reaction states. Lookup table may be empirically formed by taking spectroscopic measurements of established reaction states. Based upon the comparison, controller 370 may identify the reaction state as the reaction state found in the table that has spectroscopic values most closely associated with the spectroscopic measurement obtained based upon the signals from the sensor array.

As indicated by block 618, based upon the determined reaction state, a drop of fluid may be ejected from the fluid ejector onto the deposition site. In some implementations, the timing at which the drop of fluid is ejected onto the deposition site may be varied depending upon the determined reaction state. In some implementations, the volume of fluid contained in the droplet may be varied depending upon the determined reaction state. In some implementations, multiple droplets may be ejected onto the deposition site, wherein the timing or number of fluid droplets being ejected may vary depending upon the determined reaction state. In some implementations, the composition of the droplet of fluid being ejected onto the deposition site may be varied pending upon the determined reaction state. For example, in some implementations, the deposition site may be moved to a location opposite to a different fluid ejector for receiving a droplet having a different composition. In some implementations, the fluid supplied to the fluid ejector may be varied based upon the determined reaction state.

Figure 8:
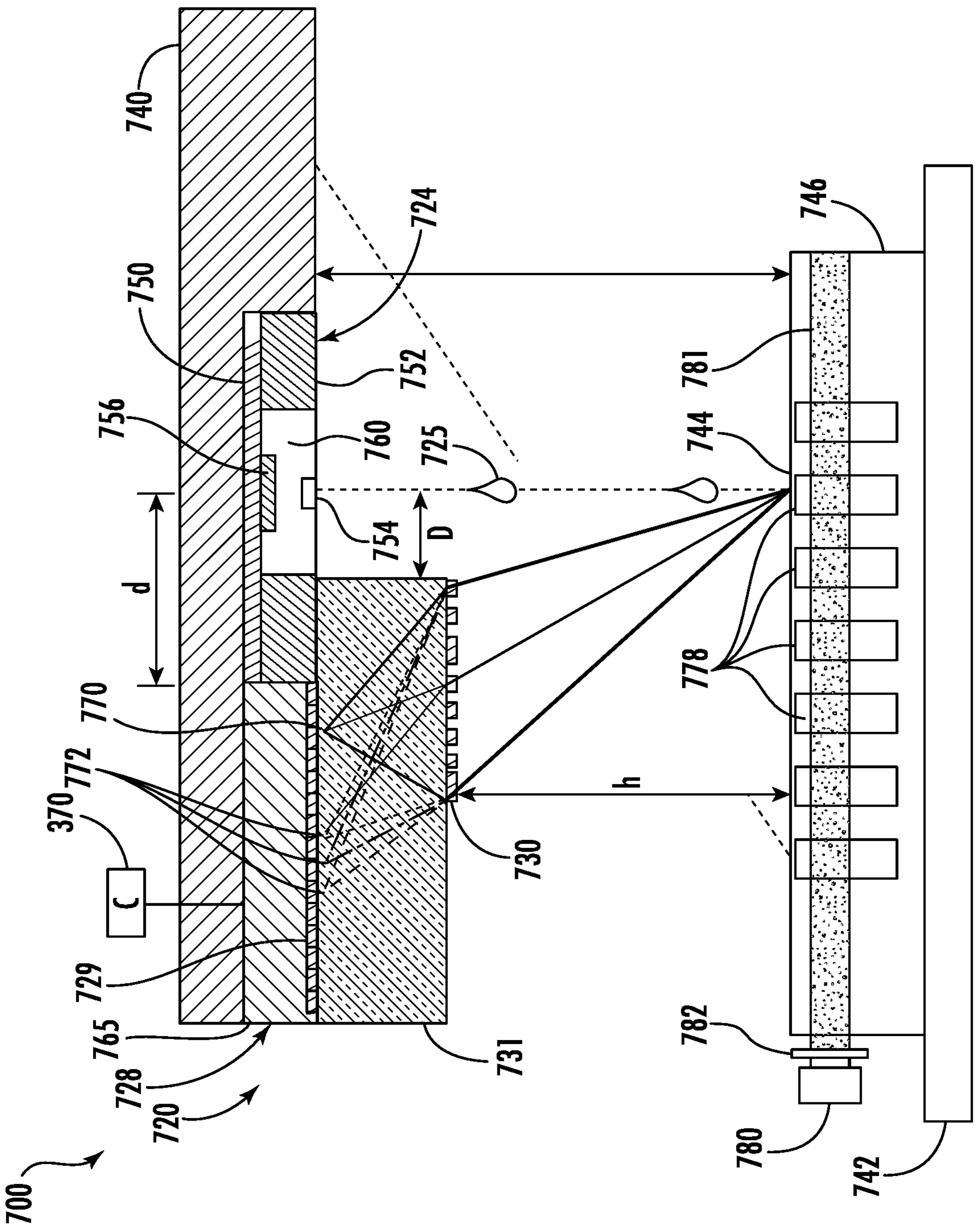
FIG. 8 is a sectional view schematically illustrating portions of an example integrated fluid ejection and spectroscopic sensing system.

FIG. 8 is a sectional view schematically illustrating portions of an example integrated fluid ejection and spectroscopic sensing system 700. System 700 comprises an integrated fluid ejection and spectroscopic sensing head 720 that concurrently aims a fluid ejector and a dispersive element of a spectroscopic sensing system at a single deposition site 744 provided by an example well plate 746 that is supported by a target support 742. FIG. 8 illustrates particular examples of a fluid ejector and sensing array integrated as part of a single package by a packaging. FIG. 8 further illustrates how sensing array may be supported so as to partially overlap a fluid ejector such that system 700 is more compact. Head 720 comprises fluid ejector 724, sensing array 728, dispersive element 730, packaging 740 and controller 370.

Fluid ejector 724 comprises a device to selectively eject a fluid droplet 725 or multiple fluid drops 725 towards and onto deposition site 744 of well plate 746. In one implementation fluid ejector 724 is electrically powered and controlled through the transmission of electrical signals. In the example implementation, fluid ejector 724 comprises circuitry platform 750, chamber layer 752, ejection orifice 754 and fluid actuator 756.

Circuitry platform 750 comprises a structure incorporating electrically conductive wires, traces or the like and electronic components such as transistors, diodes and various logic elements. In one implementation, circuitry platform 750 comprises what is sometimes referred to as a thin-film structure. For example, circuitry platform 750 may comprise a silicon substrate that is doped to form electrically conductive transistors and upon which layers of materials are photolithographically patterned to form electrically conductive traces for powering and selectively actuating fluid actuator 756. In one implementation, circuitry platform 750 may comprise a circuit board supporting electronic componentry.

Chamber layer 752 comprises a layer or multiple layers of material supported and formed upon circuitry platform 750. Chamber layer 752 defines an internal chamber 760 which is fluidly connected to a source of fluid for being ejected through ejection orifice 754. In one implementation, chamber layer 752 may be formed from a photo-imageable, photoresist epoxy. In one implementation, chamber layer 752 may be formed from a Bisphenol A Novolac epoxy that is dissolved in an organic solvent (gamma-butyrolactone (GBL) or cyclopentanone, depending on the formulation) and up to 10 wt % of mixed Triarylsulfonium/hexafluoroantimonate salt as the photoacid generator). In other implementations, chamber layer 752 may be formed from other materials such as glass, ceramics, polymers or the like.

Ejection orifice 754 comprises an opening, such as a nozzle opening, through which fluid within chamber 760 is displaced and ejected. In one implementation, ejection orifice 754 is formed by an opening extending through an orifice plate secured to chamber layer 752. In another implementation, ejection orifice 754 is formed in the material forming chamber layer 752. In such an implementation, chamber layer 752 may be formed from multiple layers of the same material, wherein the bottom most layer forms the ejection orifice 754.

Fluid actuator 756 comprises a device that, upon being actuated, displaces fluid within a fluid ejection chamber of chamber layer 752 through ejection orifice 754. In one implementation, fluid actuator 756 comprises a thermal resistor which, upon receiving electrical current, heats to a temperature above the nucleation temperature of the fluid so as to vaporize a portion of the adjacent fluid to create a bubble which displaces the fluid through the associated orifice. In other implementations, fluid actuator 756 may comprise other forms of fluid actuators. In other implementations, fluid actuator 756 may be in the form of a piezo-membrane based actuator, an electrostatic membrane actuator, mechanical/impact driven membrane actuator, a magneto-strictive drive actuator, an electrochemical actuator, and external laser actuators (that form a bubble through boiling with a laser beam), other such microdevices, or any combination thereof.

Although fluid ejector 724 is illustrated as having a single chamber 760, a single fluid ejection orifice 754 and an associated single fluid actuator 756, in other implementations, fluid ejector 724 may comprise an array of chambers 760, orifices 754 and fluid actuators 756. For example, fluid ejector 724 may comprise columns of such orifices 754 and fluid actuators 756. In some implementations, fluid ejector 724 may comprise a sliver (having a length to width ratio of 10:1 or more) partially encapsulated or surrounded by an epoxy mold compound which forms packaging 740.

Sensor array 728 comprises a linear or two-dimensional array of sensing elements, each element outputting electrical signals based upon and in response to the impingement of dispersed light received from dispersive element 730. Sensor array 728 comprises an array of individual optical or light sensing elements 729 supported by an electronics platform 765. The individual optical light sensing elements 729 receive light focused by dispersive element 230 through substrate 731 and outputs electrical signals based upon the received light. The electronics platform 765 supports electrically conductive traces, transistors and other electronic componentry for powering and operating light sensing elements 729.

In one implementation, elements 729 and electronic platform 765 may comprise a thin film, a circuit board, a die or other unitary structure. In some implementations, the individual sensing elements of sensor array 28 may each comprise a complementary metal-oxide-semiconductor (CMOS), a charge coupled device (CCD) sensor element, a photodiode (PiN), photo-resistive sensor element or other types of a sensing element.

Dispersive element 730 receives light reflected from deposition site 744 and disperses the light (similar to a prism) onto sensor array 728. In the example illustrated, dispersive element 230 is supported by a transparent substrate 731. Transparent substrate 731 comprises a layer or multiple layers sandwiched between dispersive element 230 and sensor array 728. Transparent substrate 731 spaces dispersive element 230 from sensor array 728 to enhance focusing of the dispersed light onto sensor array 728.

In one implementation, transparent substrate 731 has a thickness of 20 microns or more. In some implementations, transparent substrate 731 has a thickness of no greater than 2 mm. For optical performance, transparent substrate 731 may have a thickness of 100-500 microns. In one implementation, transparent substrate 731 may be formed from a transparent material such as SU8, quartz, or other transparent polymers, resists, PMMA, glass flavors. In other implementations, transparent substrate 731 may be formed from other transparent materials or may have other thicknesses. In some implementations, transparent substrate 731 may be omitted to enhance nozzle and optical surface servicing.

Dispersive element 730 focuses and disperses light received or reflected from deposition site 744 through transparent substrate 731 and onto sensor array 228. In an implementation, dispersive element 730 comprises a dispersive element having a thickness of 1 μm or less, facilitating a short working distance of less than 2 mm without difficult alignment given its flat form. In some implementations, dispersive element 730 comprises a flat lens in the form of a Fresnel lenses, zone plate lenses or meta-lenses. The lens may include an amplitude mask for computational imaging.

Figures 9A, 9B, 9C:
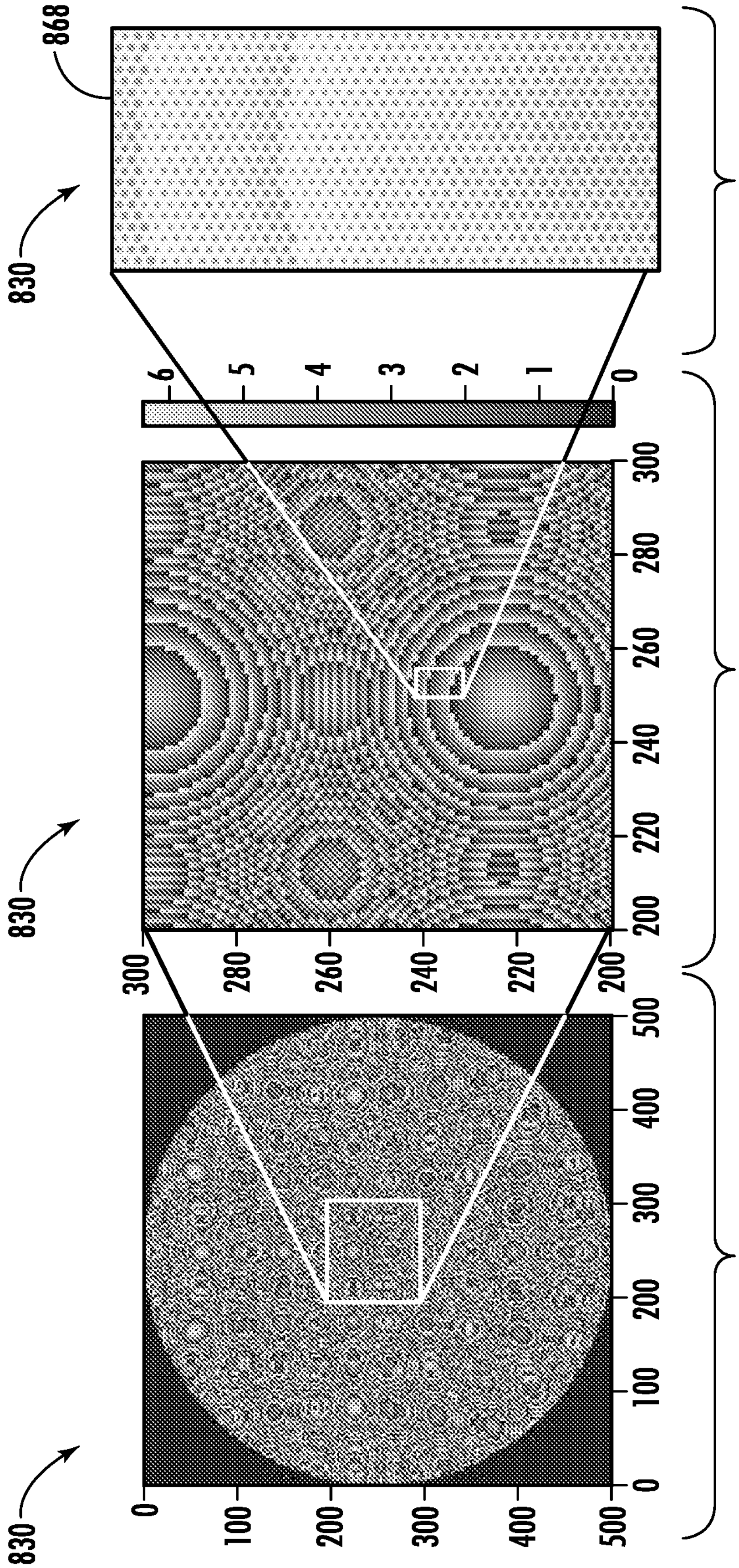
FIG. 9A is a top view of an example dispersive element for the system of FIG. 8.
FIG. 9B is an enlarged view of a portion of the dispersive element of FIG. 9A.
FIG. 9C is a further enlarged view a portion of the dispersive element of FIG. 9B.

FIGS. 9A, 9B and 9C illustrate dispersive element 830, an example of dispersive element 730. Dispersive element 830 comprises a flat lens in the form of a meta lens. In an example implementation, dispersive element 830 has a phase distribution that is sampled approximately every 50 to 300 nm in x,y with a phase resolution of Π/7 or less for diffraction-limited performance. As a result, focusing efficiency may be as high as 80% to 90%, but may involve the fabrication of features having small sizes , for example less than 100 to 200 nm. In the example illustrated, the phase sampling is provided with pillars 868 (shown in FIG. 9C), also referred to as resonators, of different diameters having the illustrated distribution. In the example illustrated, the distribution of pillars 368 has a phase profile having a continuous smooth function of x,y except for zone boundaries where the phase is folded in 2Π to facilitate ease of fabrication. In one implementation, the pillars comprise cylindrical nano-resonators with a hexagonal configuration (six pillars equally spaced about a center pillar), the individual pillars having a height of 400 nm, a center to center spacing of 325 nm and the outer pillars 868 having an angular offset of 60° . In one implementation, the pillars may be formed from a transparent material such as $TiO_2$. In other implementations, the pillars shown in FIG. 9C may be formed from other material such as amorphous silicon or transparent polymers. The meta lens provides a high refractive index (anything above n=1.5 to n=3 and above depending on wavelength), a low absorbency at a working wavelength range (transmission better than 70%, including absorption and scattering losses), and low roughness (greater than or equal to λ/4 and in some implementations, λ/14 or to λ/100, wherein λ is the wavelength). In some implementations, the meta-lenses may be made from metallic nanostructures, which have significantly more losses, but might be easier to fabricate. The meta-lenses (both metallic and dielectric) may also be made of nanostructures other than pillars. Such pillars may be any shape such as square pillars, polyhedrons, v-shaped polyhedrons, and other topological deformations, coupled resonators, and so on.

Figure 10A:
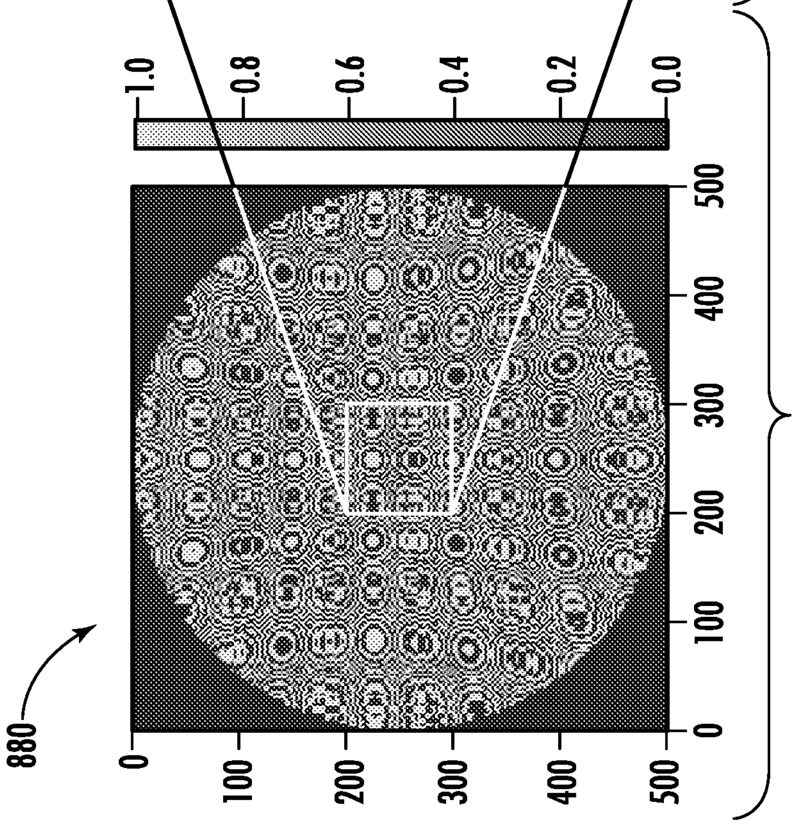
FIG. 10A is a top view of an example dispersive element for the system of FIG. 8.
Figure 10B:
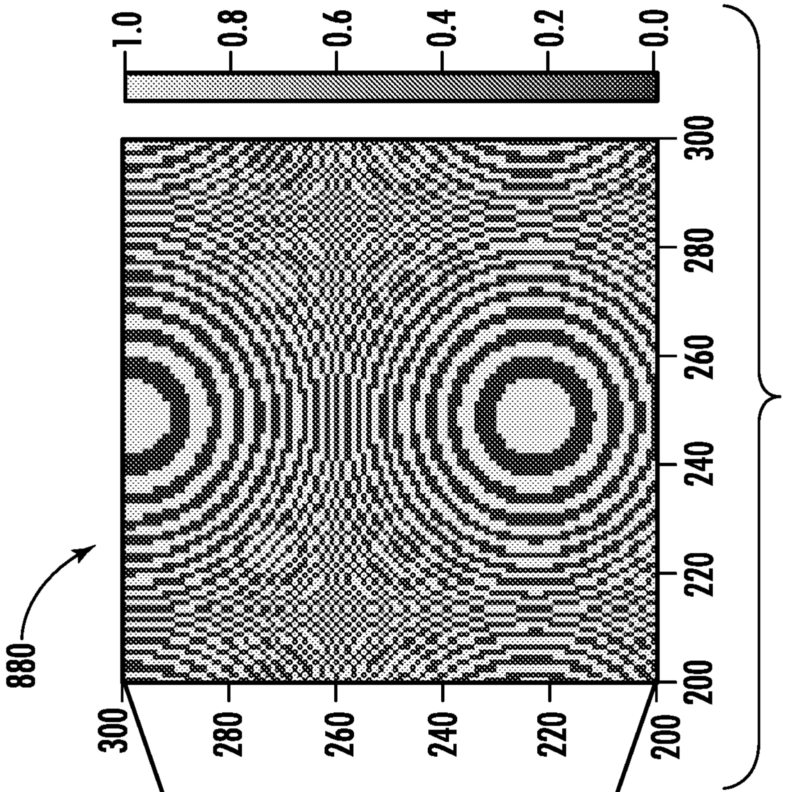
FIG. 10B is an enlarged view of a portion of the dispersive element of FIG. 10A.

FIGS. 10A and 10B illustrate dispersive element 880, another example of dispersive element 730. Dispersive element 880 comprises a flat lens in the form of a zone plate. Dispersive element 880 is phase sampled at a few discrete levels. In one implementation, the zone plate of dispersive element 880 is sampled at two levels (0, Π) or up to Π/4 increments. As a result, fabrication is easier due to the larger minimum feature size. In contrast to a meta lens, lens efficiency may be below 40% transmission efficiency. However, the zone plate may be fabricated with e-beam lithography out of low absorbency material such as Polydimethylsiloxane (PDMS), also sometimes referred to as dimethylpolysiloxane or dimethicone, or other similar materials such as polymethyl methacrylate (PMMA).

As further shown by FIG. 8, dispersive element 730 overlaps portions of fluid ejector 724. Portions of both transparent substrate 731 and dispersive element 730 overlap portions of fluid ejector 724. Portions of transparent substrate 731 are sandwiched between dispersive element 730 and fluid ejector 724. As a result, dispersive element 730 may be supported more closely to ejection orifice 754 and the deposition site 744 for sensing of deposition site 744. In other implementations, this overlap may be omitted.

In the example illustrated, dispersive element 730 is designed to produce two different focal points, different spots on the sensor array where light is focused. Dispersive element 730 may have a first focus directing different colors of light to a single spot on the sensor array and a second focus directing different colors of light to different spots along the sensor array. A first focal point 770 (a zero order focal point) comprises non-dispersed light to serve as a reference image with reduced aberrations for diagnostics and spectral calibration. The spacing separating the first focal point 770 and each of the second focal points 772 (the first order focal points) may be used to identify the color of each of the second focal points 772. Second focal points 772 provide chromatic dispersion that is used for spectral analysis. Spectral information may be encoded in the distance between focal points 770 and 772. In some implementations, dispersive element 730 may be designed so as omit the zero order focal point 770. In such implementations, calibration may be performed at the time of assembly. System 700 may carry out spectroscopic sensing in one of multiple available modes including ultraviolet, visible light, infrared, fluorescent and Raman modes.

In some implementations, the dual foci are obtained by designing a phase profile as the sum of two-way fronts that are focused by design into separate locations. The phase profiles for the zero order and the first order, respectively, may be as follows:

$$\varphi_0(x) = \frac{2\pi}{\lambda_0}\left[\sqrt{x^2+f^2} - f\right]$$

and $$\varphi_1(x) = \frac{2\pi}{\lambda_0}\left[\sqrt{(x+d)^2+f^2} - \sqrt{d^2+f^2}\right]$$

where f is the focal length of the lens in the image space, x is the coordinate on the lens plane, and d is the lateral displacement of the second focus from the perpendicular and $\lambda_0$ is the design wavelength scaled by the refractive index of the respective medium. The two phase profiles are then superimposed, optionally with other phase profiles for object space focal optimization to yield the total phase shift distribution that in turn informs the meta surface's design.

Packaging 740 integrates fluid ejector 724 and sensor array 728 as a single unit or package. In the example illustrated, packaging 740 supports sensor array 728 so as to be coplanar with fluid ejector 724, alongside fluid ejector 724. In the example illustrated, packaging 740 extends along a backside and is directly connected to fluid ejector 724 and sensor array 728. In the example illustrated, packaging 740 partially encapsulates fluid ejector 724 and sensor array 728, extending on back sides of fluid ejector 724 and sensor array 728 and about sides of fluid ejector 724 and/or 7sensor array 728.

In the example illustrated, fluid ejector 724 and dispersive element 730 are concurrently aimed at deposition site 744 such that fluid droplets may be deposited upon deposition site 744 and deposition site 744 may be spectroscopically sensed without relative movement of deposition site 744 or head 720. In an example implementation, packaging 740 comprises a liquid or moldable material which is molded about portions of fluid ejector 724 and sensor array 728 and then solidified or hardened such as through curing or evaporation to form the single integral package.

Target support 742 supports well plate 746 providing deposition site 744 generally opposite to fluid ejector 724 and sensor array 728. In one implementation, target support 742 may comprise an X-Y movable platform for selectively positioning different deposition sites opposite to fluid ejector 724 and sensor array 728. In one implementation, target support 742 supports well plate 746 such that deposition site 744 is spaced from fluid ejection orifice 754 by no greater than 10 mm.

Controller 370 controls operation of head 720. Controller 370 may carry out methods 500 and 600 described above. For example, controller 370 receives spectroscopic information obtained from sensor array 728 and analyzes the information to determine a reaction state at deposition site 744. Based upon such analysis, controller 370 may adjust the timing at which droplets 225 are being ejected by fluid ejector 724, may adjust the power or other operating characteristics of fluid ejector 724, and/or may adjust the relative positioning of head 720 and target support 742.

In an example implementation, system 700 has the following geometric characteristics. The spacing d between the ejection orifice and the edge of the sensor array 728 is between 50 microns and 5 mm, and nominally 0.5 mm. The printing distance H is between 100 microns and 5 mm, and nominally 2 mm. The magnification M provided by the sensor array 728 is between 0.05× and 20×, and nominally 0.3×. The transparent substrate 731 has a thickness h1 of MH/(1+M), a thickness of between 20 microns and 3 mm, and nominally 0.4 mm. The working distance h2 between dispersive element 730 and deposition site 744 is h, between 100 microns and 5 mm, and nominally 1.54 mm. The orifice to substrate edge distance D (fluidically constrained) is between 50 microns and 3 mm, and nominally 0.2 mm. In other implementations, system 200 may have other geometric characteristics which may vary depending upon the characteristics of fluid ejector 724, deposition site 744, sensor array 728 and dispersive element 730.

In the example illustrated, deposition site 744 comprises one of multiple wells 778 of well plate 746. Each of the multiple wells 778 serves as an individual micro-reactor where contents of the well may undergo biological and/or chemical reaction. Spectroscopic sensing of the contents of such wells 778 to determine a reaction state of the contents is facilitated within excitation source 780 that directs light 781 through a dichroic filter 782 and into the interior of each of wells 778 through transparent portions of well plate 746. The illumination of the contents stimulates or causes fluorescence emissions, facilitating observance of a response spectrum. In one implementation, excitation source 780 comprises a mercury lamp. In another implementation, excitation source 780 may comprise a light-emitting diode (LED) light source.

In the example illustrated, the interior of each wells 778 is illuminated by light that is directed through the transparent sides of well plate 746 and it individual well 778. In some implementations, the illumination of the interior of each of wells 778 may occur from above or below each of such wells 778. In some implementations, such illumination may be integrated into packaging 740 and aimed towards each of the wells 778 to minimize or reduce specular reflections reduce or eliminate reliance upon filtering provided by dichroic filter 782.

Figure 11:
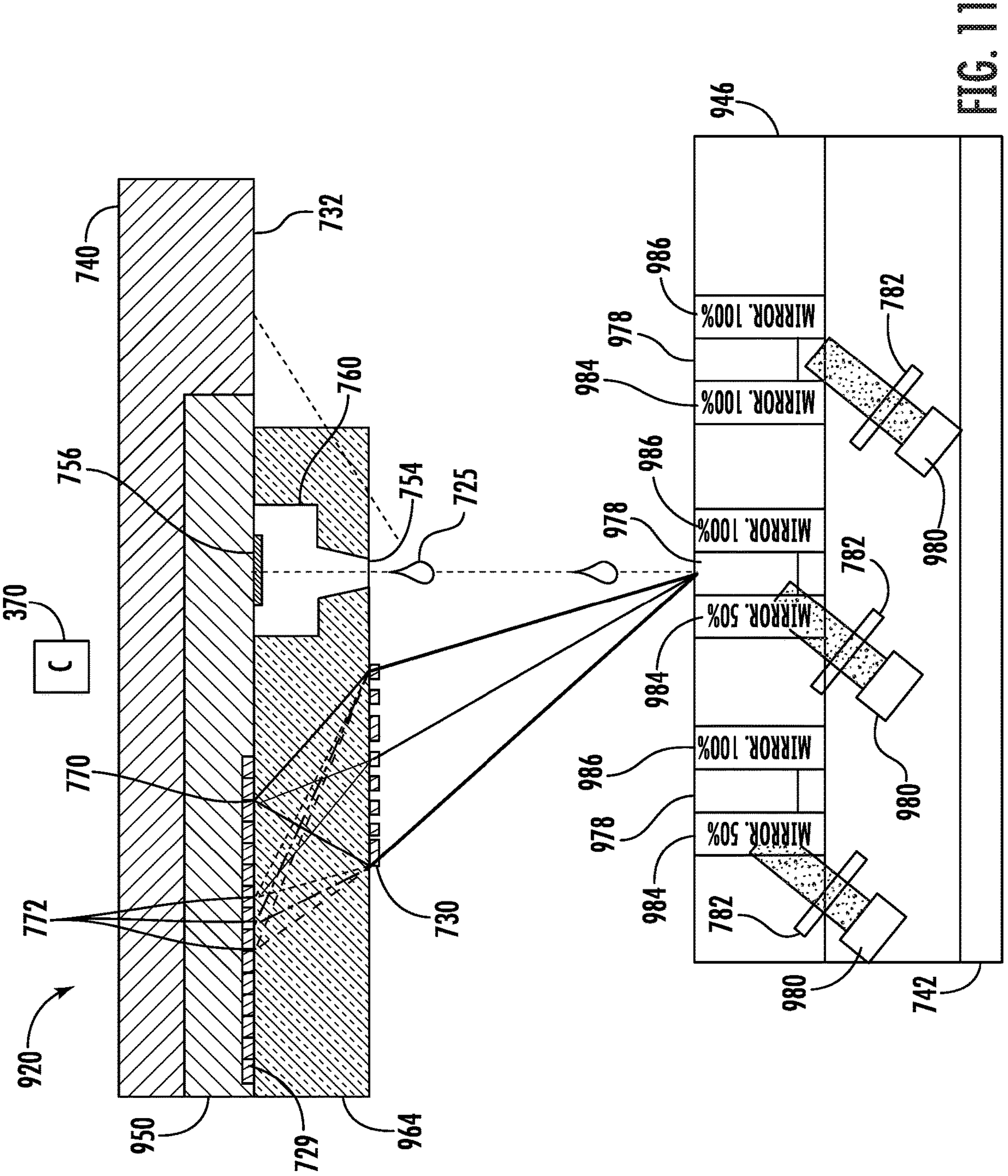
FIG. 11 is a sectional view schematically illustrating portions of an example integrated fluid ejection and spectroscopic sensing system.

FIG. 11 is a sectional view schematically illustrating portions of an example integrated fluid ejection and spectroscopic sensing system 900 comprising an example integrated fluid ejection and spectroscopic sensing head 920, multi-well plate 946, excitation sources 980 and target support 742 (described above). FIG. 11 illustrates a further degree of integration as between a fluid ejector and components of a spectroscopic sensor. Those portions of head 920 which correspond to portions of head 720 are numbered similarly.

As shown by FIG. 11, the same circuitry platform that supports fluid actuator 756 and its associated electronic components (electrically conductive traces and transistors) also supports and carries the sensor array and its associated electronic components. The same transparent substrate that supports dispersive element 730 and through which dispersed light is focused by onto the imaging array also forms the chamber layer for the fluid ejector. As a result, head 920 is more compact and may be less complex or less costly to fabricate. Head 920 comprises circuitry platform 950, fluid actuator 756, transparent substrate 964, dispersive element 730 and sensor array 728. In the example illustrated, portions of circuitry platform 950 and portions of transparent substrate 964 along with fluid actuator 756 form a fluid ejector. Portions of circuitry platform 950 and portions of transparent substrate 964 further form portions of a spectroscopic sensor.

Circuitry platform 950 includes electrically conductive traces, transistors and other electronic componentry for powering and controlling both fluid actuator 756 (described above) and the spectroscopic sensing elements 729. Circuitry platform 950 may additionally comprise electrically conductive traces for transmitting electrical signals. Circuitry platform 950 may be in the form of a thin film, a circuit board or a single electronic die.

Transparent substrate 964 is similar to transparent substrate 731 described above except that transparent substrate 964 further extends below and across fluid actuator 756 while serving as a chamber layer that also provides fluid ejection chamber 760 (described above). In one implementation, transparent substrate 964 is formed from SUB. In other implementations, transparent substrate 964 may be formed from other materials such as quartz, glass, polymers and the like. In an example implementation, transparent substrate 964 additionally forms ejection orifice 754 (described above). In another example implementation, a separate orifice plate is mounted over portions of transparent substrate 964 to form ejection orifice 754. As with transparent substrate 731, transparent substrate 964 supports dispersive element 730, wherein dispersive element 730 focuses dispersed light through transparent substrate 964 and onto the array of sensing elements 729.

Multi-well plate 946 comprises wells 978 which serve as deposition sites for biological cells, chemicals, media, reagents and/or other solutions that may be used for propagating reactions. Each of wells 978 comprises a first partially reflective, partially transmissive side wall or surface 984 and a second opposite reflective side wall or surface 986. In some implementations, the surfaces 984 and 986 may be asymmetrically coated with different thicknesses of reflective material. The thickness may be controlled such that surfaces 984 are partially reflective.

In some implementations, surfaces 984 may be formed from a partially reflective, partially reflective mirror. For example, the coating forming the partially reflective mirror may have a thickness less than the skin depth of the metal. The skin depth refers to the depth at which electromagnetic radiation is able to penetrate into the metal. Different metals may have different characteristic skin thicknesses. In some implementations, the metal may have a skin depth of 20 to 30 nm, whereas the coating has a thickness of 10 nm, resulting in the coating being partially transmissive and partially reflective.

Surface 986 has a greater reflectivity as compared to surface 984. In the example illustrated, surface 986 is fully reflective, 100% reflective. In some implementations, surfaces 986 are less than fully reflective. The reflective coating may increase light path length in the fluid for enhanced spectroscopic detection. The longer light path, due to the light bouncing or reflecting off of reflective surfaces, increases absorption of light by molecules within the well to enhance emissions from the molecules, such as fluorescence, to increase the signal-to-noise ratio of the sensed emissions. In some implementations, in lieu of the asymmetric coating illustrated, each of wells 978 may be symmetrically coated with a reflective coating, such as where both of surfaces 984, 986 are fully reflective, wherein excitation sources 980 are positioned to direct light into the interior of the wells 978 through a light transmissive floor of such wells 978.

Excitation sources 980 may be similar to excitation source 780 described above. Excitation sources 980 are provided for each of wells 978 and are supported so as to direct light through surface 984 into the interior of their respective wells 978. Each of excitation sources 980 directs light through a dichroic filter 782 and through surface 984 into the interior of its associated well 978. The illumination of the contents within the wells 978 (serving as deposition sites) stimulates or causes fluorescence emissions to facilitate spectroscopic sensing.

Figure 12:
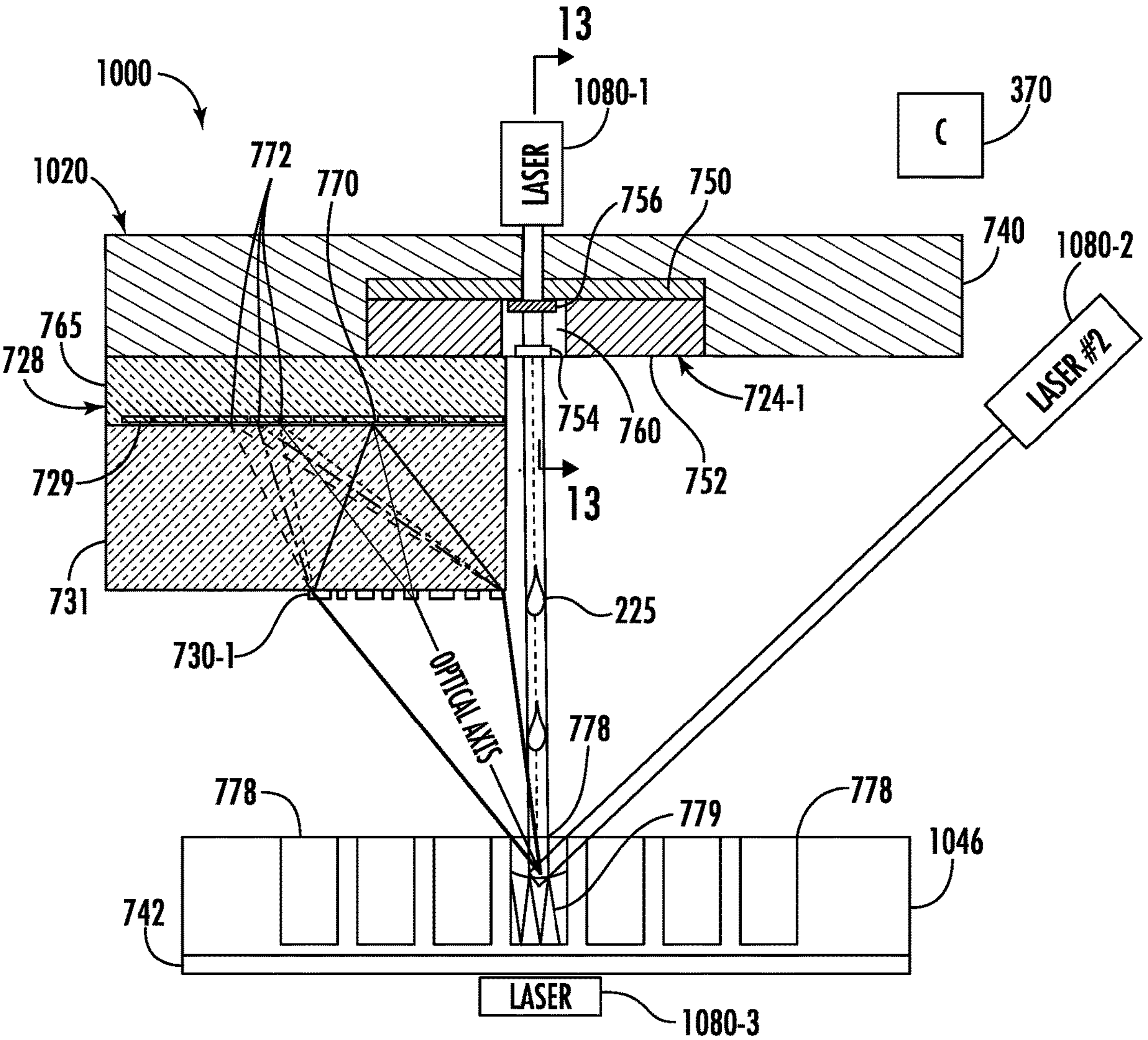
FIG. 12 is a sectional view schematically illustrating portions of an example integrated fluid ejection and spectroscopic sensing system.
Figure 13:
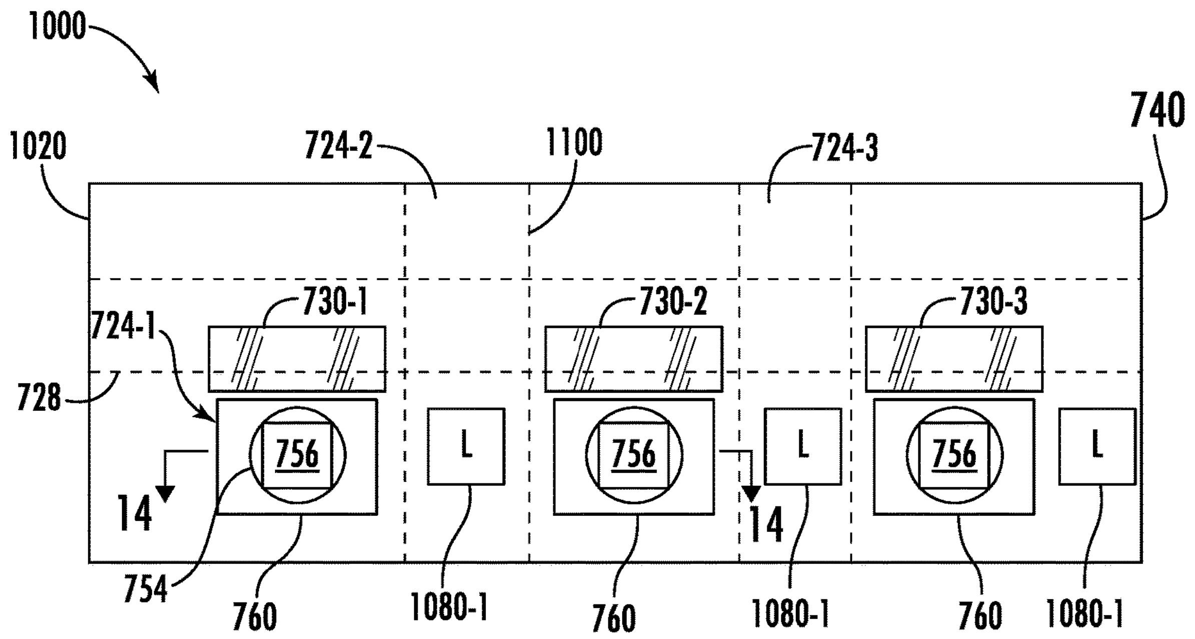
FIG. 13 is a sectional view of the system of FIG. 12 taken along line 13-13.
Figure 14:
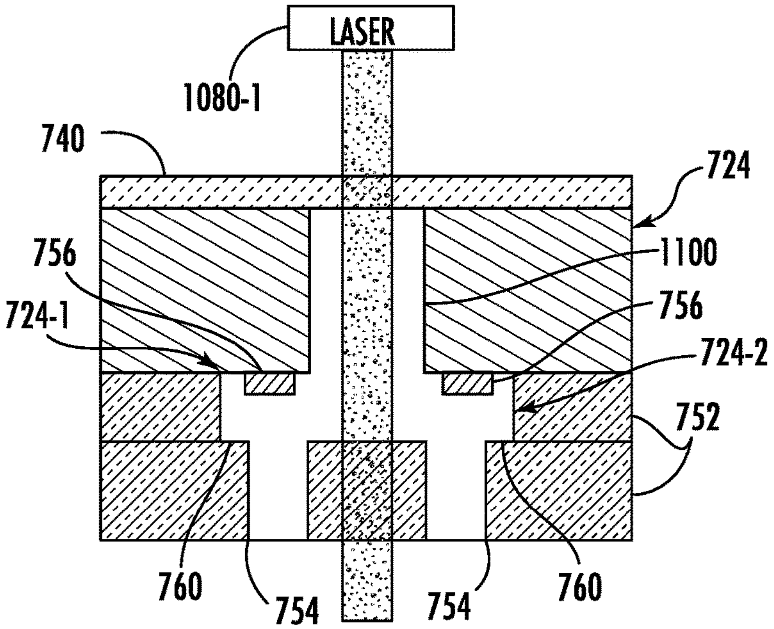
FIG. 14 is a sectional view of the system of FIG. 13 taken along line 14-14.

FIGS. 12-14 illustrate portions of an example integrated fluid ejection and spectroscopic sensing system 1000. FIGS. 12-14 illustrate different methods for exciting the contents of a well plate to facilitate enhanced spectrometry measurements by an integrated fluid ejection and spectroscopic measurement system. System 1000 comprises fluid ejection and spectroscopic sensing head 1020, well plate 1046 supported by target support 742 and excitation sources 1080-1 1080-2 and 1080-3 (collectively referred to excitation sources 1080).

Head 1020 is similar to head 720 described above except that head 1020 is specifically designed to comprise a translucent or transparent portion for transmitting electromagnetic radiation towards the wells of well plate 1046 for exciting the contents of the wells. As a result, the contents of the wells of well plate 1046 may be excited from above, such as from excitation source 1080-1, potentially increasing the compactness of system 1000 as well as the effectiveness of the excitation of the contents. In some implementations, the translucent or transparent portion is to transmit visible light, such as from a laser. In some implementations, the translucent or transparent portion is to transmit other wavelengths of light or electromagnetic radiation.

In the example illustrated, the translucent or transparent portion is formed in the die providing fluid ejectors 724-1, 724-2 and 724-3 (shown in FIG. 14) and, in some implementations, part of packaging 740 extending over the fluid ejectors. As shown by FIG. 13, fluid ejectors 724-1, 724-2 and 724-3 (collectively referred to as ejectors 724), formed by fluid ejection orifices 754, fluid actuators 756 and ejection chambers 760, are arranged in rows or columns along packaging 740. In the example illustrated, fluid ejectors 724-1, 724-2 and 724-3 have respective dispersive elements 730-1, 730-2 and 730-3. In the example illustrated, sensor array 728 comprises a single continuous band or strip of elements 729 (shown in FIG. 12) extending along the row or column of fluid ejectors 724. Distinct portions of the continuous band or strip of elements 729 may be associated with distinct fluid ejectors 724. In other implementations, each of fluid ejectors 724 may have an associated sensor array 728.

As shown by FIGS. 13 and 14, the ejection chambers 760 are supplied with fluid for ejection from fluid supply slots 1100 that extend between consecutive fluid ejectors 724. Excitation sources 1080-1 are supported by packaging 740 or supported by external structures opposite to fluid supply slots 1100. As shown by FIG. 14, portions above slot 1100 are translucent or transparent for transmitting light or other radiation from excitation source 1080-1. Portions of chamber layer 752 are also translucent or transparent for transmitting light or other radiation from excitation source 1080-1. As a result, light or other radiation from excitation source 1080-1 passes through slot 1100 and through chamber layer 752 into impingement with the contents of an individual well 778 that is currently receiving droplets 225 from fluid ejectors 724-1. In some implementations, fluid supplied through fluid feed holes, wherein excitation source 1080-1 transmits light through the fluid feed hole towards into the well 778 and is currently receiving droplets 225 from a fluid ejector 724.

In the example illustrated, excitation sources 1080 are in the form of lasers which direct a collimated beam of a narrowband of illumination through head 1020 into the well currently receiving droplets from a fluid ejector 724 and undergoing spectrometry sensing. In other implementation, excitation sources 1080 may direct other wavelengths of electromagnetic radiation chosen so as to stimulate or excite the contents of the well. For example, the electromagnetic radiation directing the well may cause contents of the well to emit a fluorescence which may be more observable by sensor array 728.

Excitation sources 1080-1 are supported so as to be aimed at the same deposition site at which the associated dispersive elements 730 and the associated fluid ejectors 724 are also aimed. In the example illustrated, the excitation source 1080-1 associated with fluid ejectors 724-1 and dispersive elements 730-1 is supported so as to direct and excitation light or other electromagnetic radiation into the interior of the same well 778 that is currently aligned with fluid ejectors 724-1 and the focus of dispersive elements 730-1. In some implementations, excitation source 1080-1 is supported at an angle so as to be aimed into the well. In some implementations, excitation source 1080-1 is sufficiently close to ejection orifice 754 such that light from excitation source 1080-1, although parallel to and offset from the trajectory path of the fluid droplets 225, is directed into the same well that is currently receiving droplets from fluid ejectors 724-1. Said another way, the distance offsetting ejection orifice 754 and excitation source 1080-1 is sufficiently small such that the light from excitation source 10801 still passes through the same mouth of the well 778 receiving droplets from the ejection orifice 754.

Well plate 1046 comprises an array of individual wells 778. In the example illustrated in which excitation source 1080-1 illuminates individual wells from above and through head 1020, the internal walls of each of well 778 may be made reflective such as by coating the internal surfaces with a reflective material. As shown by lines 779, this may result in the light from excitation source 1080-1 being reflected multiple times to increase absorption of the light by the molecules of the contents within the well 778. The increased absorption of light may lead to greater emissions which may be more detectable by sensor array 728, reducing the signal-to-noise ratio of sensor array 728.

As further shown by FIG. 12, other excitation sources, such as excitation sources 1080-2 and 1080-3 may be utilized to excite the contents of the individual wells 778. Excitation source 1080-2 may be in the form of a laser which directed collimated beam of light into the interior of a selected one of well 778. Excitation source 1080-3 may be in the form of a laser which directs a collimated beam of light through a floor of a well 778. In some implementations, the floor may be translucent or transparent. In other implementations, the floor may be partially reflective, partially transmissive. Excitation source 1080-3 may direct the light at an angle (relative to horizontal) into the designated well 778.

Although the present disclosure has been described with reference to example implementations, workers skilled in the art will recognize that changes may be made in form and detail without departing from the disclosure. For example, although different example implementations may have been described as including features providing various benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. An integrated fluid ejection and spectroscopic sensing system comprising:

a fluid ejector to eject a droplet of fluid through an ejection orifice towards a deposition site;

a sensor array; and a dispersive element to project dispersed light onto the sensor array, wherein the dispersive element, the sensor array and the fluid ejector are joined as part of an integrated unit, wherein the dispersive element has a first focus directing different colors of light to a single spot on the sensor array and a second focus directing different colors of light to different spots along the sensor array.

2. The system of claim 1, wherein the fluid ejector and the dispersive element are supported such that the fluid ejector and the dispersive element are concurrently aimed at the deposition site.

3. The system of claim 1 further comprising a packaging comprising a homogeneous body partially surrounding and supporting the fluid ejector, the sensor array and the dispersive element as part of the integrated unit.

4. The system of claim 1, further comprising a controller to control fluid ejection by the fluid ejector based upon signals from the sensor array, wherein the controller is to determine a reaction state at the deposition site and wherein the controller is to control fluid ejection by the fluid ejector based upon the reaction state at the deposition site.

5. The system of claim 1, wherein the dispersive element comprises a flat lens selected from a group of flat lenses consisting of: a zone plate, a meta-lens and a Fresnel lens.

6. The system of claim 1 further comprising:

a well plate comprising a well providing the deposition site; and an excitation source directed towards contents of the well so as to stimulate a fluorescence emission from the contents within the well.

7. The system of claim 6, wherein the excitation source is supported to direct light through the fluid ejector towards the well.

8. The system of claim 6, wherein the well comprises reflective internal surfaces.

9. The system of claim 8, wherein the reflective internal surfaces comprise a partially reflective surface, wherein the excitation source directs light through the partially reflective surface into the well.

10. The system of claim 1 further comprising:

a controller to control fluid ejection by the fluid ejector based upon signals from the sensor array; and a second fluid ejector joined to the fluid ejector as part of the integrated unit, wherein the controller is to output control signals directing the second fluid ejector to eject a second droplet of fluid towards the deposition site based upon signals from the sensor array.

11. The system of claim 1 further comprising:

a second sensor array joined as part of the integrated unit; and a second dispersive element to project light onto the second sensor array, the second dispersive element being joined as part of the integrated unit, wherein the dispersive element has first focal point for a first deposition site and wherein the second dispersive element has a second focal point for a second deposition site.

12. An integrated fluid ejection and spectroscopic sensing method comprising:

providing a sensor array;

providing a dispersive element to project dispersed light onto the sensor array;

providing a fluid ejector to eject a drop of fluid through an ejection orifice toward a deposition site;

concurrently aiming the fluid ejector and the dispersive element at the deposition site, wherein the dispersive element has a first focus directing different colors of light to a single spot on the sensor array and a second focus directing different colors of light to different spots along the sensor array;

ejecting a drop of fluid from the fluid ejector onto the deposition site; and obtaining a spectroscopic measurement of the deposition site based upon signals from the sensor array.

13. The method of claim 12 further comprising controlling a characteristic of the drop of fluid ejected from the fluid ejector onto the deposition site based upon the spectroscopic measurement.

* * * * *